United States Patent [19]
Kobayashi

[11] Patent Number: 5,131,626
[45] Date of Patent: Jul. 21, 1992

[54] HOUSINGS FOR BUTTERFLY VALVES AND METHOD FOR MANUFACTURING THE SAME

[76] Inventor: Takao Kobayashi, No. 15-16, Momohamacho, Hiratsuka-shi, Kanagawa-ken, Japan

[21] Appl. No.: 800,096

[22] Filed: Nov. 29, 1991

[30] Foreign Application Priority Data

Dec. 5, 1990 [JP] Japan .................................. 2-407452

[51] Int. Cl.$^5$ .............................................. F16K 1/22
[52] U.S. Cl. ................................. 251/305; 29/890.12
[58] Field of Search ............................ 251/305, 366; 29/890.12, 890.13, 890.132

[56] References Cited

U.S. PATENT DOCUMENTS 4,083,219  4/1978  Combes et al. .............. 29/890.12 X

FOREIGN PATENT DOCUMENTS 2035170  6/1980  United Kingdom .......... 29/890.132

Primary Examiner—John C. Fox
Attorney, Agent, or Firm—Wegner, Cantor, Mueller & Player

[57] ABSTRACT

A housing arrangement for a butterfly valve including an annular valve housing, a valve rod rotatably and axially inserted through the valve housing, the valve rod crossing at right angles with a fluid passage, and a valve member in a substantially disk form, the valve member sliding tightly on the inner surface of the valve housing as the valve rod rotates, and the valve housing is built up of a valve housing body which includes bearing bushes and is of a given profile in section and a valve rod supporting tube, the valve housing body being obtained by expanding and turning over a metal tube material in the outward direction until its both end faces are brought into contact with each other at substantially its central portion and welding the faces of contact together.

5 Claims, 6 Drawing Sheets

HOUSINGS FOR BUTTERFLY VALVES AND METHOD FOR MANUFACTURING THE SAME

BACKGROUND OF THE INVENTION

1. Field of the Invention

The present invention relates to a butterfly valve arrangement used with a fluid pipe, and seeks to provide a valve housing which is obtained by the plastic working of a metal tube used as the raw material. This valve housing is reduced in weight and improved in accuracy.

2. Prior Art

So far, butterfly valve housings have been made by machining metal castings. Problems with these cast valve housings that they are increased in weight, have defects such as cavities, are expensive to process, and so on. Recently, such butterfly valve housings have been mass-produced by press-working metal sheets or tubes to obtain a plurality of parts, welding them together and machining the resulting integral pieces to impart the required accuracy thereto, as typically set forth in Japanese Patent Laid-Open No. 62(1987)-63279 (hereinafter referred to as the prior invention).

This prior invention may solve the problems associated with the conventional cast valve housings to some extent, but poses a grave problem in terms of the structure of the valve housing bodies and how they are made. This will now be explained with reference to FIG. 4, which is a sectional view of a butterfly valve used with the valve housing according to the prior invention. An inner shell 44 is formed by a press-working process which causes stress to remain in the largest amount among various working processes, and both ends of the inner shell 44 where residual stress is maximized and most likely to be released are arc-welded to both ends of an outer shell 45. Thus, thermal and residual stresses interact, giving rise to serious strain. It is this strain that has an adverse influence on the degrees of concentricity of bearings and the roundness of the inner circumference of the valve housing, intruding on smooth rotation of the valve or complete sealing of a fluid. Also, welding of upper and lower bearing bushes 48 and 47 to the inner shell 44 results in a further increase in thermal strain. The above welded portions are all functionally important and so should be additionally processed as by machining to impart accuracy to them, polishing to rid their surfaces of oxides and heat treatments to adjust their metal structure. Nonetheless, the valve housing according to the prior invention is far from that obtained by casting and post-machining in terms of accuracy. In order to provide valve housings having the high accuracy required for automatic regulating or high-pressure valves, which will be in great demand from now on, much more elaboration is still needed.

SUMMARY OF THE INVENTION

According to one aspect of this invention, there is provided a housing arrangement for a butterfly valve including an annular valve housing 1, a valve rod 2 rotatably and axially inserted through said valve housing, said valve rod crossing at right angles with a fluid passage, and a valve member 3 in a substantially disk form, said valve member sliding tightly on the inner surface of said valve housing as said valve rod rotates, wherein said valve housing is built up of a valve housing body 4 which includes bearing bushes 16 and 17 and is of a given profile in section and a valve rod supporting tube 5, said valve housing body 4 being obtained by expanding and turning over a metal tube material 10 in the outward direction until its both faces are brought into contact with each other at substantially its central portion as shown at 13 in FIG. 5 and welding the faces 13 of contact together.

According to the first aspect of this invention the welded portions suffer least strain by welding, because stress is most difficult to be released therefrom. In view of functionality, no large welding strength is needed; welding bead length and depth can be reduced with little or no thermal strain by welding. In addition, post-machining can be dispensed with, because it is not required for the welded portions to have function-wise accuracy.

According to the second aspect of this invention, the bearing bushes 16 and 17 are preferably formed by ejecting the mother material of the metal tube material. This enables such welding as carried out in the prior invention to be dispensed with, thermal strain to be less likely and surface oxidation to be avoided, thus rendering unnecessary the machining and polishing of the inner surface of the valve housing.

According to the third aspect of this invention, there is provided a method for making a housing arrangement for a butterfly valve including an annular valve housing 1, a valve rod 2 rotatably and axially inserted through said valve housing, said valve rod crossing at right angles with a fluid passage, and a valve member 3 in a substantially disk form, said valve member sliding tightly on the inner surface of said valve housing as said valve rod rotates, wherein said valve housing is built up of a valve housing body 4 which includes bearing bushes 16 and 17 and is of a given profile in section and a valve rod supporting tube 5, which comprises the steps of:

(1) roll-forming or press-working to expand and turn over a metal tube material 10 in the outward direction until its both end faces are brought into contact with each other at substantially its central portion as shown at 13 in FIG. 5, (2) welding the faces of contact together to form a hollow, annular member 14 of a substantially circular shape in section, and (3) roll-forming said hollow, annular member 14 to form a hollow, annular member 15 of a given profile in section.

According to step (1), residual stress is limited and unlikely to be released; according to step (2), strain by heat is negligibly small and aging cracking by residual stress is avoided as well; and according to step (3), the desired configuration of the valve housing body can be achieved with high accuracy yet with small force.

According to the fourth aspect of this invention, the bearing bushes 16 and 17 are formed by ejecting the mother material of the metal tube material by press-working or bulging. This additional step, when applied to the fourth aspect thereof, enables thermal strain to be further reduced and prevents the inner surface of the valve housing body from being surface oxidized, dispensing with post-machining and -polishing.

With the above means, the degrees of concentricity of the bearing bushes and the accuracy of the inner and outer faces of the valve housing in association with the bearing bushes can be made equivalent to those of a valve housing finished by machining and cutting after casting.

In this specification "roll-forming" means generally the process of forming by applying a rolling or spinning tool to a rotating material.

DETAILED EXPLANATION OF THE PREFERRED EMBODIMENTS

Embodiment 1 that is the best mode for embodying this invention will now be explained with reference to FIGS. 1, 3, 5, 6 and 7.

Figure 1:
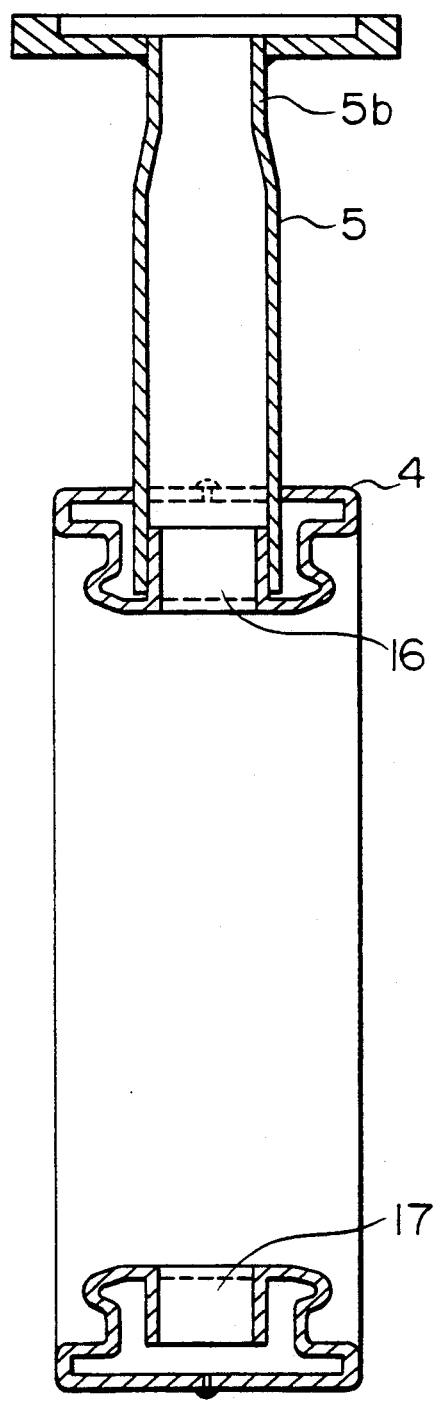
FIG. 1 is a sectional front view of the valve housing of Embodiment 1 according to this invention.
Figure 2:
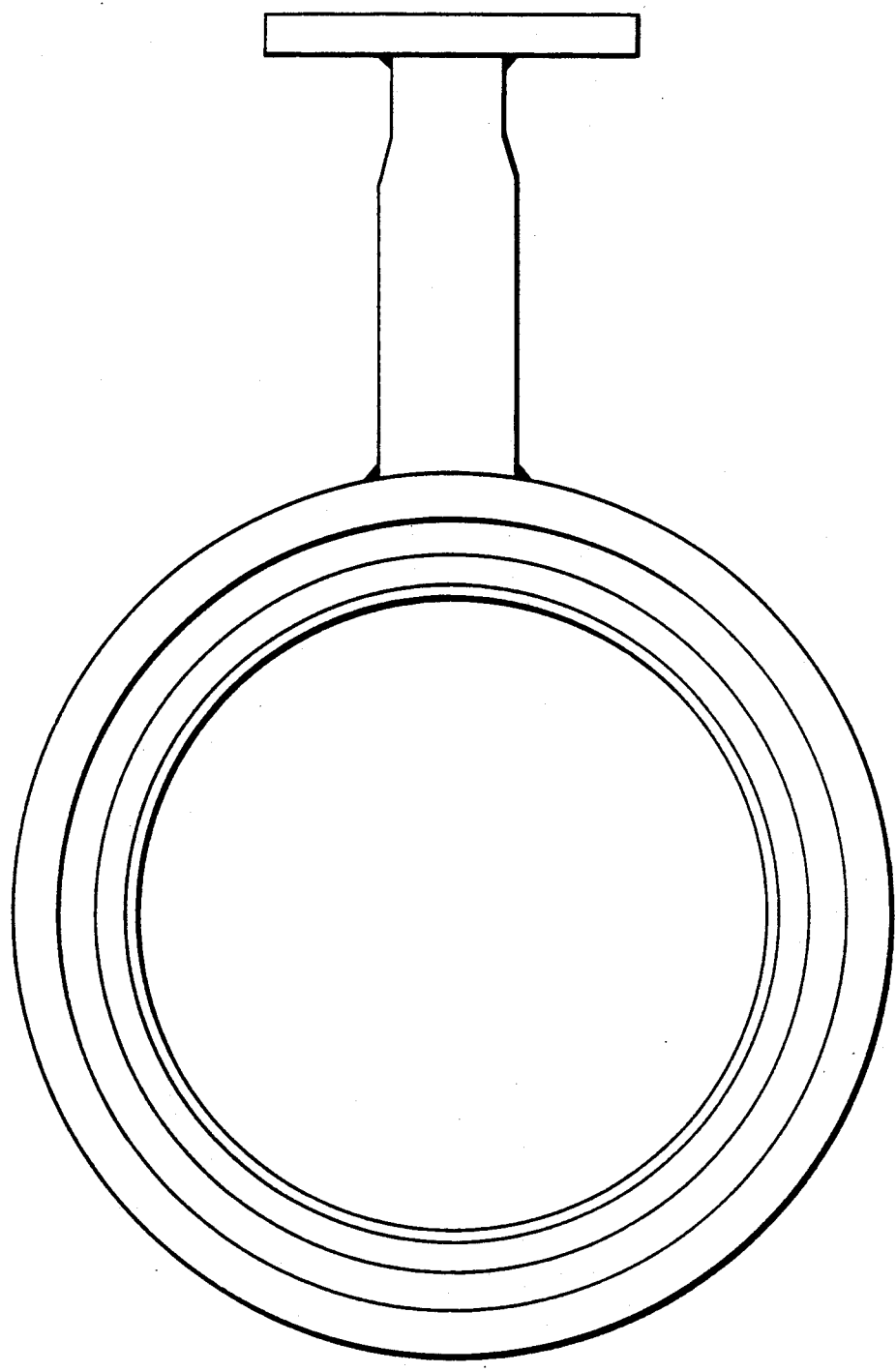
FIG. 2 is a side view of the valve housing of Embodiment 1.

As can be best seen from FIG. 1, a valve housing 1 is made up of a valve housing body 4 and a valve rod supporting tube 5 welded thereto for supporting a valve rod.

Figure 5:
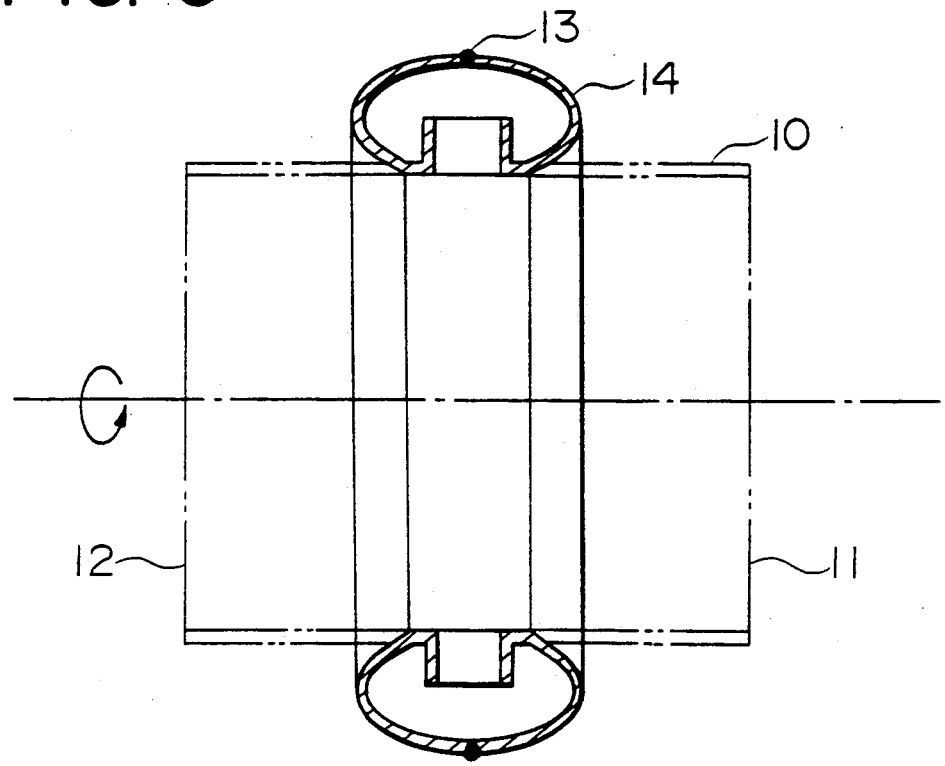
FIGS. 5, 6 and 7 are views illustrative of the most important three steps of the process for making valve housing body of Embodiment 1 according to this invention, which is made of a metal tube.
Figure 6:
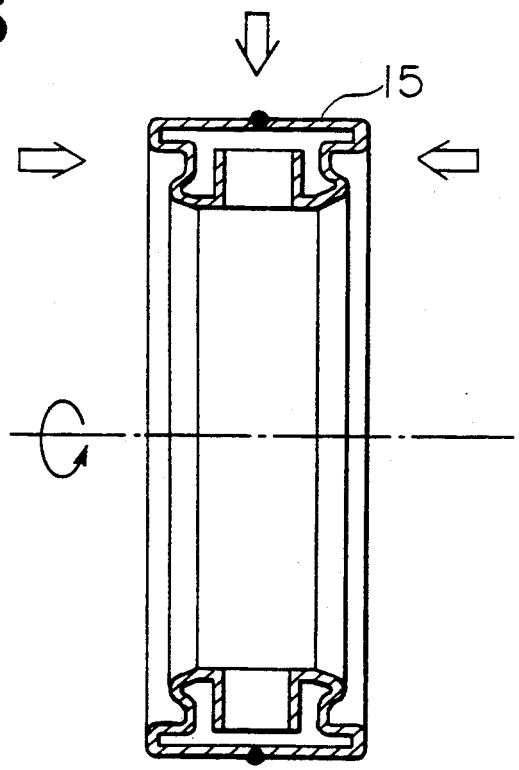
Figure 7:
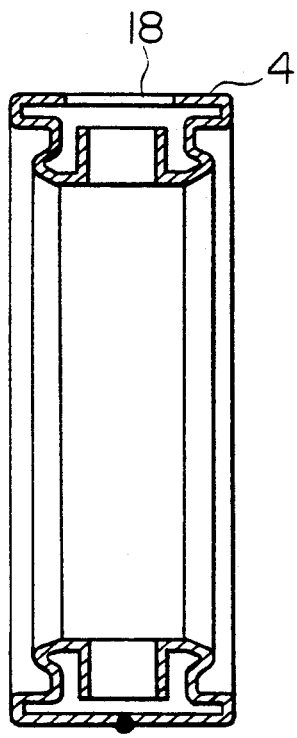

With reference to FIGS. 5, 6 and 7, how the valve housing body is made will be explained. As can be best seen from FIG. 5, a stainless-steel material 10 formed of a stainless sheet material provided with bearing bushes 16 and 17 by press-working or bulging is set on a jig on the basis of the bearing bushes. Then, the stainless-steel tube material 10, is expanded and turned over in the outward direction by roll-forming or press-working until its both end faces 11 and 12 are brought into contact with each other at substantially its central portion as shown at 13 in FIG. 5. Subsequently, both ends are welded together to form a hollow, annular member 14 of a substantially circular shape in section. Then, this annular meeting 14, while being rotated, is formed by pressing with rolls from three directions into a hollow annular member 15 of a given profile in section. The housing body is provided with a hole 18 at the positions corresponding to the bearing bushes 16 and 17, through which the valve rod supporting tube 5 is fitted onto the bearing bush 16 such that the bearing bushes 16 and 17 are located coaxially with respect to a bearing bush 5b of the housing, and then welded thereto to form the valve housing 1. In this embodiment, it is noted that expanding and turning over the stainless-steel tube material in the outward direction may be achieved by roll-forming and/or press-working depending on the material, configuration and number of the valve housing bodies being made.

Reference will be made to Embodiment 2.

Figure 3:
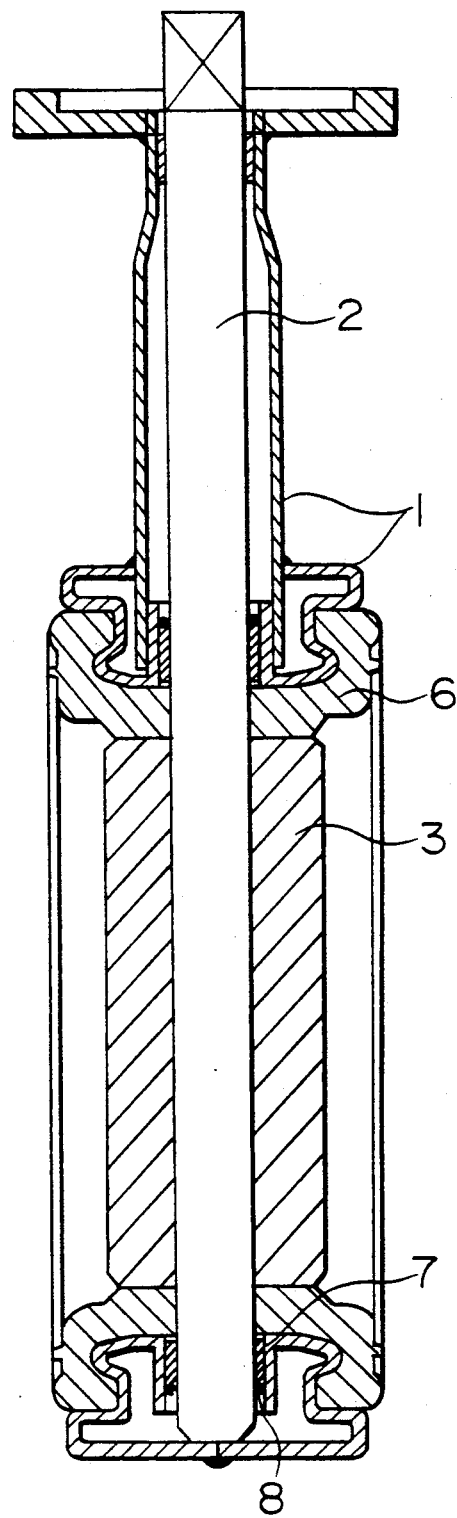
FIG. 3 is a sectional view of a butterfly valve used with the valve housing according to Embodiment 1.
Figure 4:
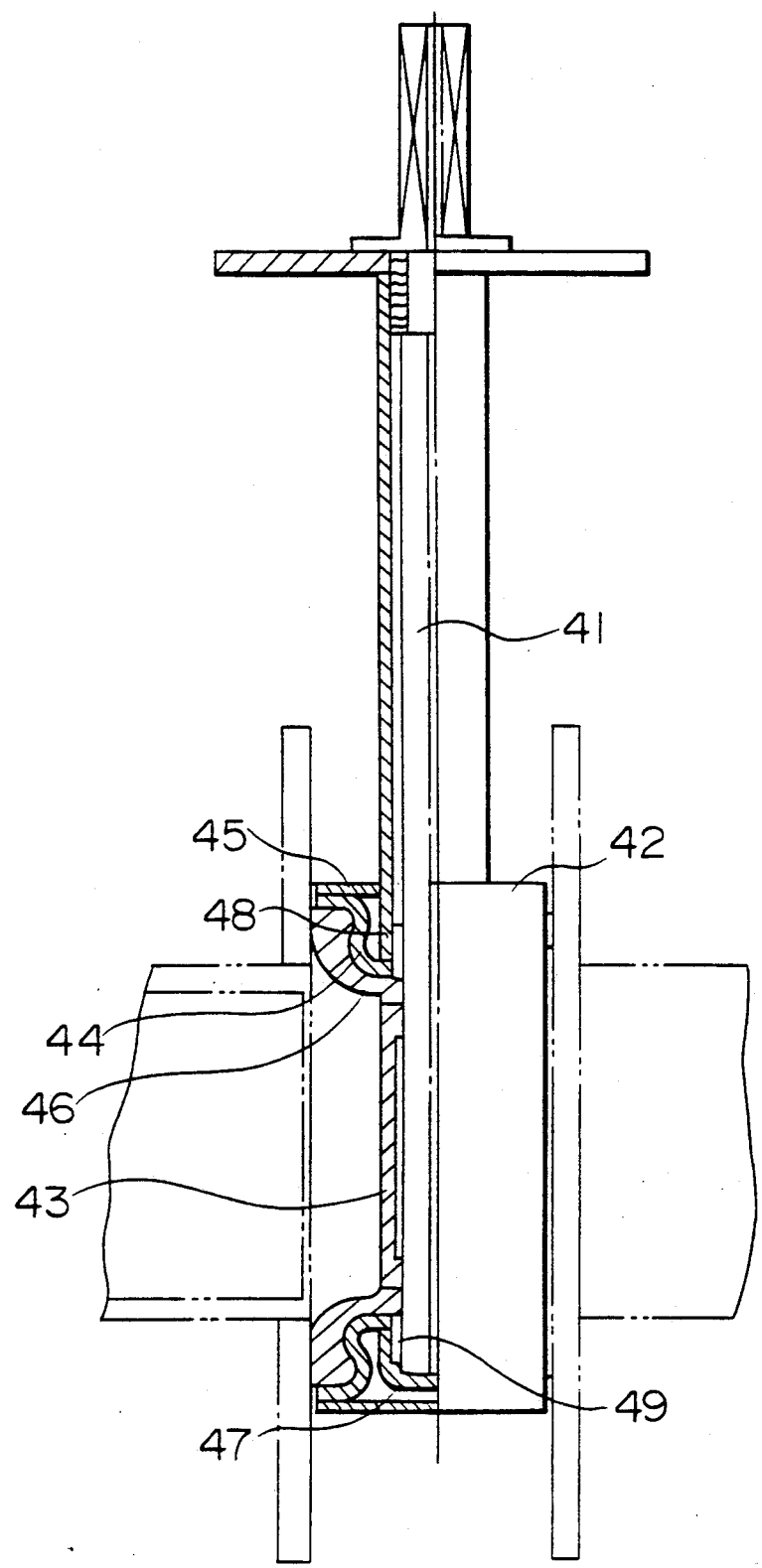
FIG. 4 is a sectional view of a butterfly valve used with the valve housing according to the prior invention.

FIG. 3 shows a sectional view of a butterfly valve used with the valve housing according to Embodiment 1. In the drawing, reference numbers 6, 7, 8 show a valve seat, a bracing metal, and an O-ring, respectively.

While Embodiment 1 has been described with reference to how the valve housing is formed using a metal tube material as the mother material, it is equally easy according to this invention to form a valve housing using a metal sheet material, because the metal tube material is made of a metal sheet material.

Figure 8:
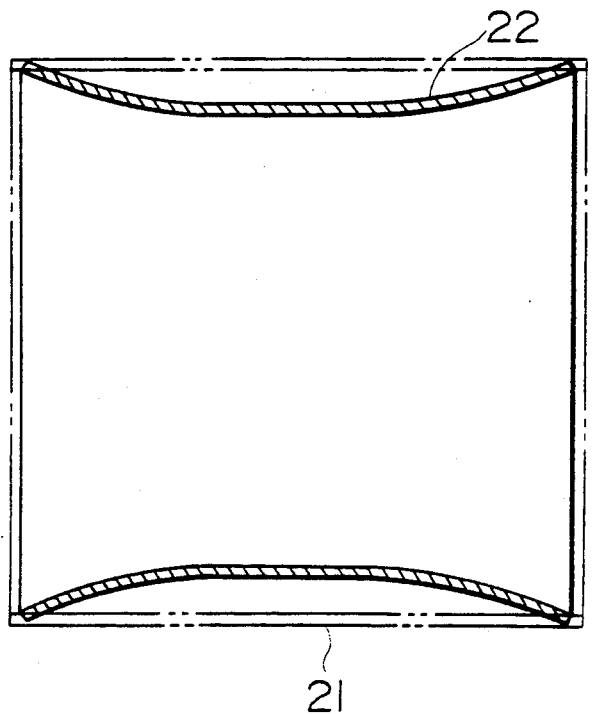
FIG. 8 is a view illustrative of how the diameter of a metal tube is reduced according to Embodiment 3 of this invention.

Embodiment 3 will now be explained with reference to FIG. 8.

A problem with producing a valve housing by roll-forming or press-working is that it is "made thin by plastic working". This embodiment is designed to solve this problem. A metal tube material 21 having an inside diameter larger than the inside diameter of a valve housing body, which is used as the mother material, is roll-formed or otherwise processed at its central portion to form a tube material 22 whose diameter is reduced to the inside diameter of the valve housing body. If this tube material 22 is expanded and turned over by roll-forming or press-working, then it is possible to obtain a valve housing body of substantially uniform thickness, thereby preventing it from becoming thin.

Alternatively, this may be done by directly roll-forming a sheet metal with extended dimention to be formed into the above tube material 22, followed by welding the joining faces together.

In this invention, what constitutes the above tube may be stainless steel, various alloys such as those based on iron, aluminium, copper, and titanium, or clad materials thereof.

As will be appreciated from the foregoing, the valve housing according to this invention has a number of advantages. Among them;

(1) It is reduced in weight and improved in rigidity, because the valve housing body is formed of a hollow, annular member.
(2) It is unlikely to undergo any thermal strain and so is of high accuracy, because it is not adversely affected by heat at all.
(3) Machining can be dispensed with, because it has been welded where no dimensional accuracy is needed.
(4) Polishing can be dispensed with, because it has been welded where no removal of oxide layers is needed.
(5) Any expense for heat treatment is not needed, because there is little change in the metal structure by welding heat.
(6) There is little possibility to produce inferior value housings, because the production process is stable.

What is claimed is:

1. A housing arrangement for a butterfly valve including an annular valve housing, a valve rod rotatably and axially inserted through said valve housing, said valve rod crossing at right angles with a fluid passage, and a valve member in a substantially disk form, said valve member sliding tightly on the inner surface of said valve housing as said valve rod rotates, wherein said valve housing is built up of a valve housing body which includes bearing bushes and is of a given profile in section and a valve rod supporting tube, said valve housing body obtained by expanding and turning over a metal tube material in the outward direction until its both end faces are brought into contact with each other at substantially its central portion and welding the faces of contact together.

2. A housing arrangement for a butterfly valve as claimed in claim 1, wherein the bearing bushes are formed by ejecting the metal tube material.

3. A method for making a housing arrangement for a butterfly valve including an annular valve housing, a valve rod rotatably and axially inserted through said valve housing, said valve rod crossing at right angles with a fluid passage, and a valve member in a substantially disk form, said valve member sliding tightly on the inner surface of said valve housing as said valve rod rotates and said valve housing is built up of a valve housing body which includes bearing bushes and is of a given profile in section and a valve rod supporting tube, in which the process for making said valve housing body comprises the steps of:

roll-forming or press-working to expand and turn over a metal tube material in the outward direction until its both end faces are brought into contact with each other at substantially its central portion, and welding the faces of contact together to form a hollow, annular member of a substantially circular shape in section, and roll-forming said hollow, annular member of a substantially circular shape in section to form a hollow, annular member of a given profile in section.

4. A method as claimed in claim 3, wherein the bearing bushes are formed by ejecting the mother material of the metal tube material by press-working or bulging.

5. A method as claimed in claim 3, which is started with the tube material having an inside diameter larger than that of said valve housing body and roll-formed or otherwise processed to reduce its inside diameter to that of the valve housing body.

* * * * *